SAMPLE AND HOLD CIRCUIT

Filed June 15, 1966

2 Sheets-Sheet 1

INVENTORS:
ALLEN B. BENSON
GEORGE G. GORBATENKO
JAMES JURSIK
RONALD E. KATH
JERRY D. OVREBO
DAVID H. SKRENES

BY Richard H. Smith ATTORNEY

Nov. 25, 1969 A. B. BENSON ETAL 3,480,795

SAMPLE AND HOLD CIRCUIT

Filed June 15, 1966 2 Sheets-Sheet 2

United States Patent Office 3,480,795
Patented Nov. 25, 1969

3,480,795
SAMPLE AND HOLD CIRCUIT

Allen B. Benson, George G. Gorbatenko, James Jursik, Ronald E. Kath, Jerry D. Ovrebo, and David H. Skrenes, Rochester, Minn., assignors to International Business Machines Corporation, Armonk, N.Y., a corporation of New York Filed June 15, 1966, Ser. No. 557,805
Int. Cl. H03k 5/20
U.S. Cl. 307—235 11 Claims

ABSTRACT OF THE DISCLOSURE

An analog signal to be sampled is fed to one input of a differential buffer amplifier connected by a diode-quad sampling switch to an integrating amplifier which provides a signal-storage function. The output of the integrator is fed back to another input of the buffer amplifier. A control circuit causes the charging current to the diode-quad to increase above its quiescent bias current during a sampling interval whenever the buffer-amplifier output exceeds a predetermined threshold. The increased charging current may be taken either from the buffer output itself or from a separate current source.

This invention relates to a sample and hold circuit and, more particularly, to a sample and hold circuit capable of highly accurate operation at extremely short cycle times.

Sample and hold circuits have long been employed for the purpose of sampling a varying analog voltage at some desired sampling time and holding, in a storage circuit, a signal level representative of the level of the analog signal at the instant of sampling. This technique is commonly employed in analog to digital (A–D) conversion circuits where the rate of change of the analog input signal is high relative to the time required to perform a digital conversion. In such an instance the analog input cannot be directly coupled to the input of the converter since the appreciable change that would occur in the analog signal during the conversion cycle would materially detract from the accuracy of the digital output. Thus, a sample and hold circuit is employed at the converter input so that the converter operates upon the held signal level rather than upon the analog input directly.

Recent improvemnets in A–D converters have made available A–D circuits capable of operating accurately at very high conversion rates and it would thus appear that these advances would enable accurate digital conversions of high frequency analog input signals. However, there has heretofore not been available a sample and hold circuit operable at speed and accuracy levels compatible with such high speed converters. Because of this the increased capabilities of these converters have, for many applications, not been usable.

A form of sample and hold circuit known to have relatively good performance characteristics, both from a speed and accuracy standpoint, is that in which a buffer amplifier, fed by the analog input signal, is connected by a sampling switch to an integrating amplifier, the feedback capacitor of which provides the signal storage function. The sampling switch responds to a sampling command to connect the output from the buffer to the input of the integrator, whereby the integrator capacitor is charged to a volage level represenative of the value, at the time of sampling, of the analog input. A negative feedback path is provided from the integrator output to the buffer input so that the actual voltage appearing at the output of the buffer is an error voltage representing the difference between the analog input and the integrator output. This feedback path enables very accurate charging of the hold capacitor.

The cycle time (the time required to switch the circuit into the sample mode to charge the hold capacitor to a new level and then to switch back to the hold mode) of this circuit is primarily dependent on the capacitor charging rate (time required for the buffer output to settle to zero). This in turn is a function of the current transfer characteristics of the sampling switch. Naturally, a high current transfer rate is required for a short cycle time.

The accuracy of the circuit may be measured by its "aperture offset." Aperture offset is the voltage difference between the signal level present at the integrator output at the time the switch begins its transition from sample to hold and the voltage at the integrator output at the time the transition ends and a stable hold state is achieved. Since the period of the analog input signal is long compared to the period of this transition, any difference in these voltage levels is solely a function of switch error, i.e., addition or removal of charge from the integrator capacitor due to the effects of the switch circuit itself and the control circuits ancillary thereto. Any amount of aperture offset is, of course, deleterious to accurate operation of the circuit since it represents a deviation from the signal level that actually should have been stored at the integrator output. In an ideal circuit aperture offset is zero.

It is therefore an important object of the invention to provide an improved sample and hold circuit of the type employing an input buffer amplifier for controlling the operation of an integrating amplifier wherein a feedback connection exists from the output of the latter to the input of the former.

A further object is to provide an improved charging circuit for the integrating amplifier of a sample and hold circuit of the class described.

Still another object is to provide an integrator charging circuit that operates to charge the integrator at a high rate while at the same time minimizing aperture offset, thus enabling fast, accurate sample and hold performance.

In accordance with the present invention, the sample and hold integrator is charged from the output of a diode quad network which is operated at a low bias current level and is controlled by the difference signal present at the buffer amplifier output. Voltage sensitive means are provided to supply supplementary charging current at the quad output when the difference voltage exceeds a predetermined threshold value, thus providing a high integrator charging rate. The voltage sensitive means operates to remove the supplementary current from the quad output just prior to the time the difference voltage reaches zero and the sample to hold transition begins. Due to the low bias level and highly balanced state of the quad during the sample to hold transition, aperture offset is virtually eliminated.

The foregoing and other objects, features and advantages of the invention will be apparent from the following more particular description of preferred embodiments of the invention, as illustrated in the accompanying drawings.

Figure 1:
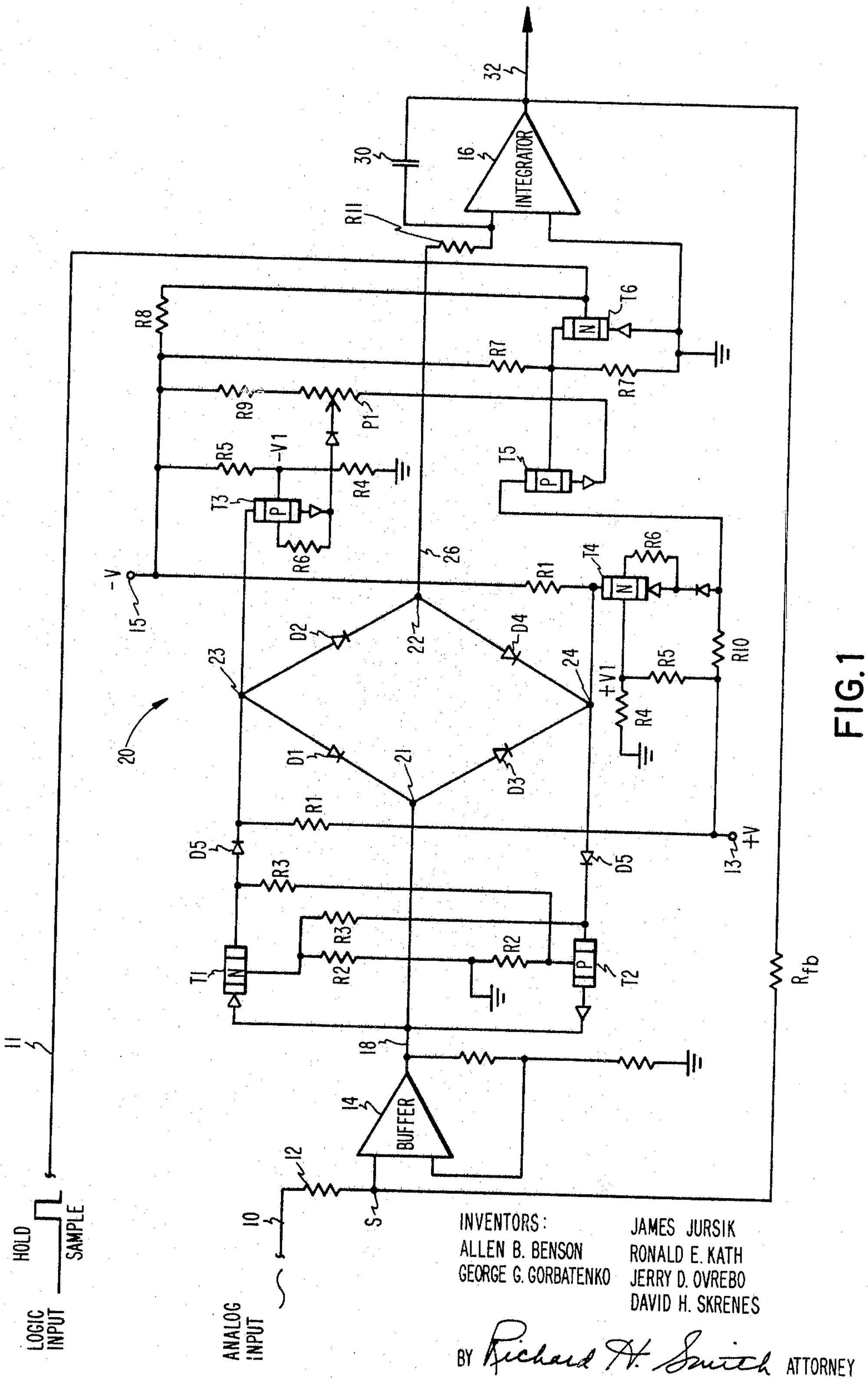
FIG. 1 is a schematic circuit diagram showing a preferred embodiment of the sample and hold circuit of the invention.

With reference to FIG. 1, a detailed description of a preferred embodiment of the invention is hereinafter given.

An analog input signal on line 10 is fed through an input resistor 12 to a high input impedance-low output impedance buffer amplifier 14 connected in the potentiometric mode. It is desirable to employ an amplifier that does not invert the input and has a low gain, e.g., 2. An integrating amplifier 16 has its output connected via feedback resistor $R_{fb}$ to a summing junction S at the input of amplifier 14 so that the voltage at the output of the latter always represents the instantaneous difference between the magnitude of the analog input signal and the level at the output of integrator 16. Of course, to enable this negative feedback effect, the connection of integrator 16 and capacitor 30 is such that during a sampling operation the voltage on line 32 proceeds to a level equal in magnitude but opposite in polarity to that of the signal on line 10.

Integrator 16 is an operational, high gain differential integrating amplifier having a feedback capacitor 30 which serves as the holding capacitor of the sample and hold circuit. The capacitance of capacitor 30 and the resistance of input resistor R11, together with the equivalent impedance of quad network 20, determine the time constant of the overall sample and hold circuit. To enable a short cycle time the values of these components should be relatively small as, for example, 120 ohms for R11, 20 ohms for the quad and 3600 picofarads for the capacitor, yielding a time constant of about 430 nanoseconds. Both the buffer and integrating amplifiers should, for optimum sample and hold operation, be capable of low noise performance.

The difference signal at the output of buffer 14 is transmitted to diode quad network 20 via line 18. The quad 20 has an input terminal 21, an output terminal 22 and a pair of control bias terminals 23 and 24. Four diodes D1, D2, D3 and D4 are arranged in a conventional quad connection between these four terminals.

The quad 20 is the basic circuit which charges the hold capacitor 30 of the integrator. The charging operation can occur only when the quad is in a forward biased state. When the quad is reversed bias, i.e., a more positive voltage appears at terminal 24 than at terminal 23, the integrator and buffer amplifiers are isolated from one another and the quad in this state is analogous to an open switch such that voltage changes on line 18 do not affect the output level on line 32 from integrator 16. Basic "on-off" control of the quad is provided in response to logic command signals on line 11 by a drive circuit including transistors T3, T4, T5 and T6, to be described in detail subsequently.

When the quad is forward biased, a fixed biasing current flows from a positive voltage source +V at terminal 13 to a negative voltage supply −V at terminal 15 via resistors R1 and the quad diodes. For proper operation the values of resistors R1 must be closely matched as must be the values of the voltage sources as well as the characteristics of the four diodes.

In accordance with the well known theory of operation of a diode quad network, the voltage level at output terminal 22 remains substantially equal, throughout a given range, to the voltage level at input terminal 21 when the quad is in its on state. The reason for this is as follows. With zero voltage on line 18 and the quad in a forward biased state current conduction through diodes D1 and D2 is equal to that through diodes D3 and D4 and the voltage at output terminal 22 is at the zero level. A slight positive shift at terminal 21 tends to shift D1 toward a back-biased state which cuts down the current conduction through it. This forces additional current through D2 which matches the additional current flowing through D3 due to the voltage rise at terminal 21. The voltage shifts at terminals 22 and 24 due to these current increases cause diode D4 to shift toward its back biased state an amount exactly equal to that experienced by D1. Since the current flow through D4 is thus equally reduced, the amount of current diverted to output line 26 exactly matches the amount of current received on input line 18 due to the voltage rise. The voltage increase at terminal 22 thus follows that at terminal 21. During this shifting of conduction levels in the quad, the quad biasing current flowing from terminal 13 through resistor R1 to terminal 23 remains substantially unchanged.

When the voltage on line 18 shifts from zero to a negative level, diodes D1 and D4 shift into a more forward biased condition and D2 and D3 shift more toward the back biased state. This results in a current flow out of capacitor 30 via line 26 through D4 equal in magnitude to the current flow on line 18 toward buffer 14 due to the negative voltage shift.

In both of the above-described positive and negative voltage shift cases, it can be readily seen that the maximum current flow in either direction which can be caused on line 26 to or from the integrator is equal to the "zero-level" quad bias current, i.e., the current through the quad when the voltage at input terminal 21 is zero and the quad is forward biased. In other words, when a positive shift on line 18 is sufficient to completely back bias D1, D4 also becomes back biased and the entire flow of bias current is diverted through D2 to line 26 whereby the capacitor 30 is charged at the maximum positive rate. Similarly, when a negative shift occurs at terminal 21 which is sufficient to completely back bias diode D3, maximum negative charging current flows through diode D4. Once these maximum current levels are achieved at terminal 22, further increases in the input voltage have no effect on the charging current and the latter stabilizes at a level equal to the zero-level quad bias current.

Figure 4:
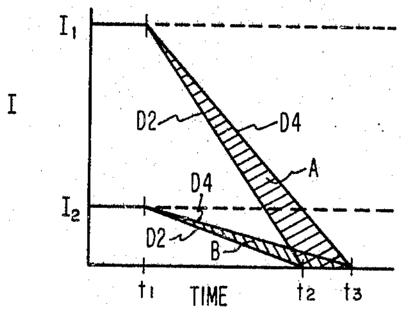
FIG. 4 is a graph illustrating the effect of different quad bias currents on aperture offset.

It is thus apparent that in order to obtain an integrator charging rate effective to produce the shortest overall sample and hold cycle time, the quad network must be biased at a current level high enough to accommodate the currents generated by the largest voltage swings expected from the buffer amplifier. However, operating the quad at a high bias current is incompatible with the realization of low aperture offset. The reason for this is that in order to turn the quad off in a manner resulting in no aperture offset, the control voltages at the terminals 23 and 24 must progress perfectly symmetrically from their respective "on" levels to their "off" levels so that the voltage at output terminal 22 remains at zero throughout the turn-off period and the charge on hold capacitor 30 remains unaltered. However, it must be realized that perfectly symmetrical turn off cannot be achieved with practical circuit components. The situation that actually occurs is depicted in FIG. 4.

Turn-off is initiated at time $t_1$ and the current level through diodes D2 and D4, initially $I_1$, starts to move toward zero. Due to imbalance inherent in the drive circuit and due to differences in the stored carrier charge level of diodes D2 and D4, the diode currents drop to zero at different rates. The current through D2 reaches zero at time $t_2$ while the current through D4 reaches zero at time $t_3$. This indicates that the voltage at terminal 22 does not stay exactly at zero during the turn-off transition. In FIG. 4 the shaded area A represents the amount of charge (aperture offset) that can flow to or from holding capacitor 30 because of the disparity in turn-off rates. FIG. 4 shows that when a significantly lower quad bias current $I_2$ is employed, the amount of aperture offset is significantly reduced, given the same disparity in turn-off times $(t_3-t_2)$. This is indicated by the smaller shaded triangle B which has an area comparing with the area of the larger triangle in accordance with the ratio of $I_2$ to $I_1$. Aperture offset is thus reduced in direct proportion to the reduction in quad bias current.

The apparent conflict brought out by the above, i.e., a high charging rate requires a high quad bias current and low aperture offset requires a low quad bias current, is overcome in the circuit of the invention by the provision of an "overdrive" circuit comprising transistors T1 and T2 (FIG. 1). When the voltage on output line 18 of buffer amplifier 14 is at or near zero, both T1 and T2 are held in nonconduction by back-biasing voltages present at their respective base and emitter terminals. If a positive swing occurs on line 18 which is sufficient to completely back bias diode D1, transistor T1 is switched into conduction by the voltage rise at its emitter and saturates, thus providing a low impedance shunt path from the output of amplifier 14 to quad control bias terminal 23. The turn-on threshold of T1 is preferably set at a level just below the reverse bias level of D1. The result is that increased current is made available to quad output line 26 through diode D2 and the throughput of the quad is no longer limited by its zero-level bias current. Since quad diodes D1 and D4 remain back biased during the time that T1 is conducting, the increased current supplied through T1 is fully utilized in charging capacitor 30. Thus, despite the low zero-level bias of network 20 the charging current supplied at the output thereof is always proportional to the magnitude of the voltage swing on line 18, even though that voltage swing generates input currents exceeding the quad bias current.

As capacitor 30 charges to the level of the analog input signal, the feedback connection through resistor $R_{fb}$ reduces the output from amplifier 14 to zero. Transistor T1 turns off when this voltage level drops below its turn-on threshold and the quad network reverts back to its conventional mode of operation. At some time subsequent to the turn-off of T1, the logic command on line 11 goes positive to initiate the transition from sample to hold.

Overdrive trasistor T2 operates in exactly the same way as transistor T1 except it is turned on by a negative swing on line 18 and provides a current shunt path to line 18 through quad diode D4 to provide high current flow out of integrator 16.

The turn-on thresholds of transistors T1 and T2 are controlled by the respective base voltages thereof. For both transistors, a voltage divider consisting of a pair of resistors R2 and R3, energized from the collector circuit of the opposite transistor, provides this bias voltage. To enable symmetrical operation of the overdrive circuits, resistors R2 must be very evenly matched as must resistors R3. Diodes D5 prevent a loss of current from the on biased quad through the collector-base junctions of T1 and T2.

OPERATION

Sample and hold command signals from some external control means are supplied on line 11 to the base of drive transistor T6. The voltage swing of these signals may be, for example, —.6 to +2 volts. When the signal is at the —.6 volt level the circuit is in the sample mode and transistor T6 is biased into saturation which turns transistor T5 on, although it does not go into saturation. With T5 conducting, the voltage levels at the emitters of drive transistors T3 and T4 is such that those transistors are nonconducting. With T3 and T4 in this state, the quad biasing current flows from terminal 13 to terminal 15 and the quad is in its "on" condition whereby it is adapted to charge the holding capacitor.

When the signal on line 11 is shifted to its positive "hold" level, transistor T6 turns off and in so doing turns off transistor T5. This causes a pair of voltage divider networks comprising resistor R4 and R5 to supply voltage levels of +V1 and —V1 to the bases of T4 and T3, respectively. Both of these transistors thus become saturated whereby their base voltages are transmitted to the control bias terminals 24 and 23, respectively. This reverse biases the quad network so that the flow of bias current therethrough ceases and integrator 16 is isolated from the buffer amplifier. The V1 voltage levels thus applied to terminals 23 and 24 during hold must be set so that the quad remains off even though the largest voltage swings of which the circuit is capable might occur on line 18. Also, these V1 voltages prevent such input swings from turning transistors T1 and T2 on.

Since, as mentioned in the previous discussion, the transition from sample to hold is most critical to aperture offset, it is highly desirable that the operation of transistors T3 and T4 be as balanced as possible. That is, that they supply the back-biasing voltages V1 at the same time and rate to control terminals 23 and 24. One way in which the circuit of the invention achieves this is in employing transistors T3 and T4 in the turn-on mode. If those transistors were employed in an opposite fashion, i.e., placed in saturation to turn the quad on and turned off to turn the quad off, a high degree of balance between them would be difficult, if not impossible, to achieve. This is because the stored carrier charge built up during saturation would have to be cleared out to turn the transistors off, appreciably lengthening the turn-off operation. Further, the amount of carrier storage in any given transistor is not a highly controllable parameter with the result that the turn-off operation of transistors T3 and T4 would be very difficult to balance.

A second way of achieving balanced operation is to employ high frequency switching transistors for the transistors T3, T4 and T5. Thus, any unavoidable amount of nonsymmetrical operation thereof tends to be minimized by the speed with which T3 and T4 are turned on by T5. Also contributing to the speed of operation of T3 and T4 is the fact that those transistors are controlled through their emitters, raher than their bases.

A third way of balancing the drive is through the use of a non-capacitive circuit for adjusting the turn-on time of transistor T3 with respect to transistor T4. While capacitive circuits could be employed to achieve the same adjustment function, they would be undesirable since such circuits tend to slow down the operation of the circuit. As shown in FIG. 1, adjustment is provided through a potentiometer P1 in the emitter circuit of T5. When the quad is in its on state, T3 and T4 are off while T5 is conducting and T6 is saturated. It can be seen that by moving the slider of potentiometer P1 upwardly T3 is biased closer to the on condition. Conversely, as the slider is moved downwardly, T3 goes deeper into the off condition. Since at the beginning of the transition from sample to hold, when T5 turn off, some time is required for the voltage to change at the collector and emitter thereof, the turn-on time of T3 with respect to T4 may be adjusted by moving P1 since the latter controls the amount of voltage swing required to turn T3 on. The diodes are provided in the emitter circuits of T3 and T4 to protect against breakdown of the base-emitter junctions thereof.

With the voltage sources connected to terminals 13 and 15 set at +30 volts and —30 volts, respectively, the following table is illustrative of one set of resistance values which enables satisfactory operation of the circuit:

| | Ohms |
|---|---|
| R1 | 3.57K |
| R2 | 4.3K |
| R3 | 1K |
| R4 | 665 |
| R5 | 1.4K |
| R6 | 10K |
| R7 | 3.48K |
| R8 | 51K |
| R9 | 845 |
| P1 | 300 |
| R10 | 976 |

Figure 2:
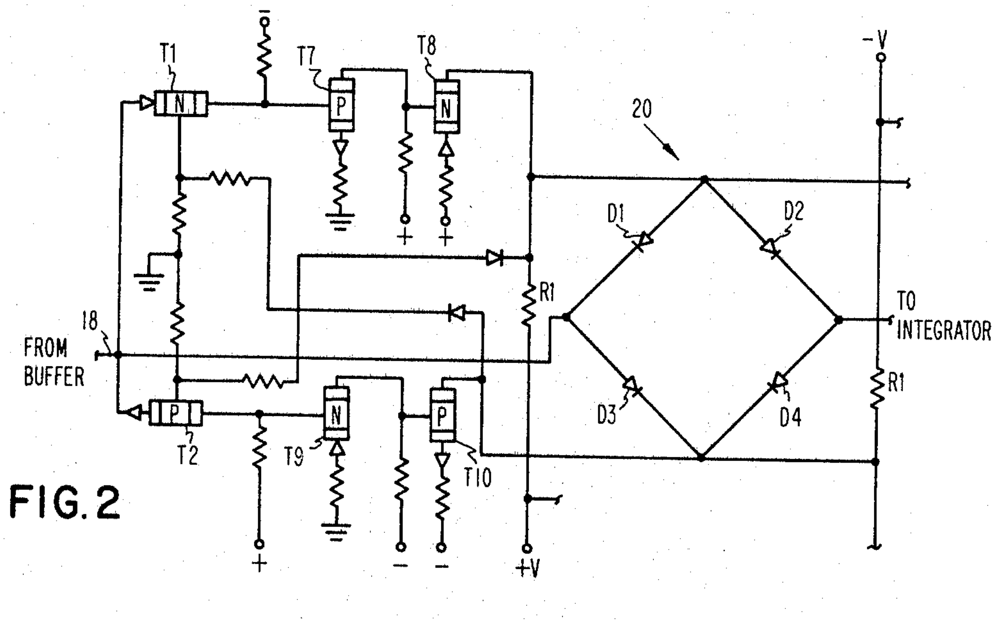
FIG. 2 is a schematic circuit diagram showing a modification of the embodiment of FIG. 1.

FIG. 2 shows a modification of the overdrive circuit of the embodiment of FIG. 1. In the circuit of FIG. 2 the overdrive circuit, instead of providing a direct conduction path from the quad to the input line 18, supplies increased charging current to the integrator from a pair of current sources T8 and T10. T8 and T10 are controlled by the voltage-sensing transistors T1 and T2 which function in the same way they function in the embodiment of FIG. 1. Transistors T7 and T9 are voltage shifting elements necessary to enable proper control of the current sources from transistors T1 and T2.

Thus, T8 and T10 are nonconducting when overdrive is not required, i.e., the voltage on line 18 is near zero However, when, for example, a positive shift on line 18 switches T1 into conduction, T8 is biased into conduction by an amount dependent upon the extent which the input swing exceeds the turn-on threshold of T1. This current is conducted, as in the previous embodiment, through quad diode D2 and is supplied to the integrator. T10 operates in the same manner as T8 except that it is turned on by a negative voltage swing on line 18 which exceeds the turn-on threshold of T2.

The current gain provided by sources T8 and T10 enables increased integrator charging rates or permits the same integrator charging rates as in the embodiment of FIG. 1 in response to smaller voltage swings at the output of the buffer amplifier. The quad drive circuit may be the same as that shown in FIG. 1 and thus is omitted in FIG. 2.

Figure 3:
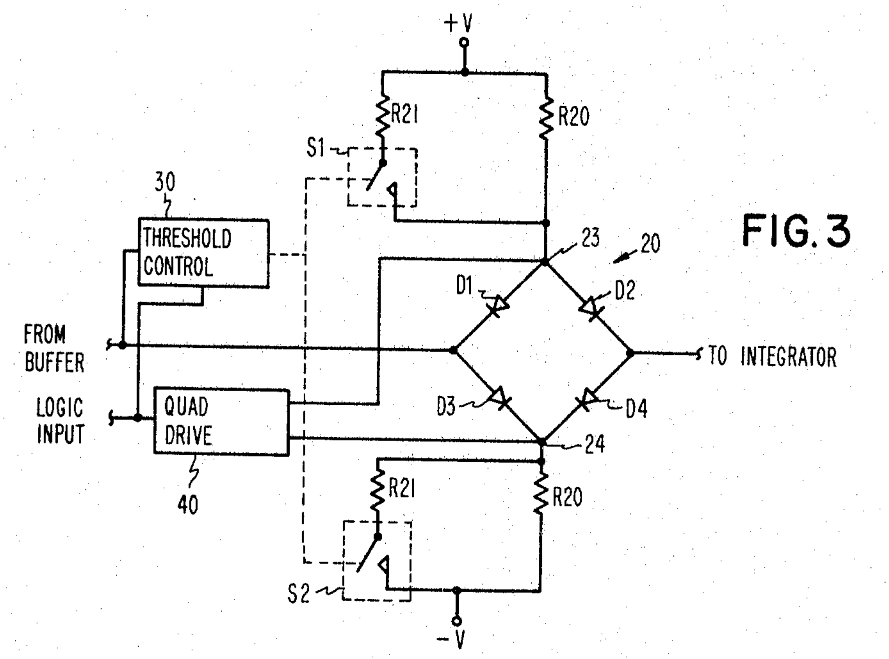
FIG. 3 is a schematic circuit diagram showing a second embodiment of the invention.

A second embodiment of the invention is shown in FIG. 3. There the quad network 20 is turned on and off by a quad drive circuit 40 which may be the same as the drive portion of the circuit of FIG. 1. A low level bias current is supplied to the quad from voltage sources +V and —V through resistors R20. Switches S1 and S2 are normally open.

When, in the sample mode, the voltage swing at the output from the buffer amplifier is great enough to completely back bias ether of the quad diodes D1 or D3, a threshold control circuit 30, which may include a pair of voltage-sensing transistors such as T1 and T2 of FIGS. 1 and 2, closes both the switches S1 and S2. This connects resistors R21, each having a resistance value significantly less than that of R20, into the quad biasing circuit. Since the equivalent resistance of each R21–R20 parallel pair is less than the resistance of R20 alone, a higher biasing current is supplied to the quad network. This increases the current throughput capabilities of the quad by an amount corresponding to the increase in bias current. It is, of courses, desirable to utilize electronic switch means for the switches S1 and S2.

It is to be noted that the chief difference between the embodiment of FIG. 3 and that of FIGS. 1 and 2 is that the former employs the quad network strictly as a quad network even during the overdrive operation. The quad is a "two level" quad with the high bias level being selected for supplying the overdrive current, which is provided entirely from the voltage source +V or the source —V. In the circuit of FIG. 1, the overdrive current is supplied directly from the buffer amplifier while in the circuit of FIG. 2 the overdrive current is a "multiplied" version of the buffer output current.

While the invention has been particularly shown and described with reference to preferred embodiments thereof, it will be understood by those skilled in the art that the foregoing and other changes in form and details may be made therein without departing from the spirit and scope of the invention.

We claim:

1. In a sample and hold circuit having charge storage means and an input circuit for generating input current proportional to the difference between an analog input voltage and the voltage at the output of said charge storage means, a charging circuit for charging said storage means to a level representative of said input voltage, said charging circuit comprising, in combination:
- a semiconductor junction network including at least four junctions, said network having a pair of control bias terminals, an input terminal and an output terminal, said input terminal being connected to said input circuit and said output terminal being connected to said storage means;
- means for selectively supplying bias current to said control bias terminals to render said network operative to supply charging current to said storage means from said output terminal; and
- control means sensitive to the magnitude of said voltage difference for causing said charging current to increase to a level above that of said bias current when said difference exceeds a predetermined threshold value.

2. In a sample and hold circuit having charge storage means and an input circuit for generating input current proportional to the difference between an analog input voltage and the voltage at the output of said charge storage means, a charging circuit for charging said storage means to a level representative of said input voltage, said charging circuit comprising, in combination:
- a diode quad network having a pair of control bias terminals, an input terminal and an output terminal, said input terminal being connected to said input circuit and said output terminal being connected to said storage means;
- means for selectively supplying bias current to said control bias terminals to render said quad network operative to supply changing current to said storage means from said output terminal; and
- control means sensitive to the magnitude of said voltage difference for causing said charging current to increase to a level above that of said bias current when said difference exceeds a predetermined threshold value.

3. The sample and hold circuit set forth in claim 2 wherein said control means comprises:
- a voltage sensitive switch operative when said voltage difference reaches said predetermined threshold value to provide a conduction path from said input terminal to said output terminal through a portion of said quad network, whereby said increased portion of said charging current is supplied directly from said input current, said switch being further operative to block said conduction path when said voltage difference drops below said threshold value.

4. The sample and hold circuit set forth in claim 2 wherein said control means comprises:
- a voltage sensitive switch connecting said input terminal to one of said control bias terminals.

5. The sample and hold circuit set forth in claim 4 wherein said voltage sensitive switch comprises:
- a transistor having its emitter connected to said input terminal and its collector connected to one of said control bias terminals.

6. The sample and hold circuit set forth in claim 2 wherein said control means comprises:
- first and second voltage sensitive switches, said first switch being operative when said voltage difference reaches a predetermined positive threshold value to provide a conduction path from said input terminal to said output terminal through a portion of said quad network and said second switch being operative when said difference reaches a predetermined negative threshold value to provide a similar conduction path, whereby said increased portion of said charging current is supplied directly from said input current, said switches being further operative to block said respective conduction paths when said voltage difference drops below said respective threshold values.

7. The sample and hold circuit set forth in claim 2 wherein said control means comprises:
- a pair of oppositely conductive voltage sensitive switches, one of said switches connecting said input circuit to a first of said control bias terminals and the other of said switches connecting said input circuit to the second of said control bias terminals.

8. The sample and hold circuit set forth in claim 7 wherein said voltage sensitive switches comprise:
- a pair of opposite conductivity type transistors each having its emitter connected to said input circuit and its collector connected to a different one of said control bias terminals, the base of each of said transistors being biased through connection to the collector of the other of said transistors.

9. The sample and hold circuit set forth in claim 2 wherein said control means comprises:

a current source adapted to selectively supply charging current to said output terminal; and a voltage sensitive switch operative when said voltage difference reaches said predetermined threshold value to turn said current source on, whereby the magnitude of said charging current is increased to a level above that of said bias current.

10. The sample and hold circuit set forth in claim 9 wherein said current source and said voltage sensitive switch comprise, respectively:

a normally nonconductive first transistor having its collector circuit connected to one of said control bias terminals; and a second transistor having its emitter connected to said input terminal and its collector connected to the base circuit of said first transistor, whereby the switching of said second transistor into conduction when said difference voltage reaches said predetermined threshold value causes said first transistor to become conductive to supply current to said control bias terminal.

11. The sample and hold circuit set forth in claim 2 wherein said control means comprises:

voltage sensitive switch means for increasing the magnitude of said bias current when said voltage difference reaches a predetermined threshold value, whereby said charging current is permitted to increase to a level above said initial bias current.

References Cited

UNITED STATES PATENTS

| | | | |
|---|---|---|---|
| 2,798,153 | 7/1957 | Dougherty et al. | 307—259 XR |
| 3,029,386 | 4/1962 | Ricker | 307—321 XR |
| 3,052,851 | 9/1962 | Heberling | 307—321 XR |
| 3,191,073 | 6/1965 | Mooney | 307—235 |
| 3,201,641 | 8/1965 | Thorne | 307—257 XR |
| 3,286,101 | 11/1966 | Simon | 328—151 XR |
| 3,363,113 | 1/1968 | Bedingfield | 307—238 |

JOHN S. HEYMAN, Primary Examiner

STANLEY T. KRAWCZEWICZ, Assistant Examiner

U.S. Cl. X.R.

307—238, 257, 321; 328—151